United States Patent
Grubb et al.

(10) Patent No.: US 10,850,828 B2
(45) Date of Patent: Dec. 1, 2020

(54) MOVABLE WING FOR WEIGHT AND BALANCE MANAGEMENT

(71) Applicant: Insitu, Inc., Bingen, WA (US)

(72) Inventors: Matthew D. Grubb, White Salmon, WA (US); Peter J. Kunz, The Dalles, OR (US); Wayne D. Goodrich, White Salmon, WA (US)

(73) Assignee: The Boeing Company, Chicago, IL (US)

( * ) Notice: Subject to any disclaimer, the term of this patent is extended or adjusted under 35 U.S.C. 154(b) by 610 days.

(21) Appl. No.: 15/473,908

(22) Filed: Mar. 30, 2017

(65) Prior Publication Data

US 2018/0281924 A1 Oct. 4, 2018

(51) Int. Cl.
*B64C 3/38* (2006.01)
*B64C 1/26* (2006.01)
*B64C 39/02* (2006.01)

(52) U.S. Cl.
CPC ............. *B64C 3/38* (2013.01); *B64C 1/26* (2013.01); *B64C 39/024* (2013.01); *B64C 2201/021* (2013.01); *B64C 2201/10* (2013.01); *B64C 2201/165* (2013.01); *B64C 2211/00* (2013.01)

(58) Field of Classification Search
CPC ..... B64C 3/38; B64C 39/024; B64C 2211/00; B64C 2211/165; B64C 2211/10; B64C 2211/021; B64C 1/26; B64C 1/30; B64C 17/02; B64C 17/00; B64C 2201/102; F02B 10/12
See application file for complete search history.

(56) References Cited

U.S. PATENT DOCUMENTS 1,819,948 A    8/1931    Diago
1,916,813 A *   7/1933    Sessa .................... B64C 23/005
                                                           244/6

(Continued)

FOREIGN PATENT DOCUMENTS

EP         3228537 A1    10/2017
RU        2172701 C2    8/2001

OTHER PUBLICATIONS

Search Report for Related European Patent Application No. 18155898. 2; Report dated Apr. 17, 2018.

*Primary Examiner* — Medhat Badawi
*Assistant Examiner* — Vicente Rodriguez
(74) *Attorney, Agent, or Firm* — Miller, Matthias & Hull LLP

(57) ABSTRACT

An aircraft includes a fuselage having a longitudinal axis, a wing assembly, and a fuselage positioning mechanism operatively connecting the fuselage to the wing assembly. The fuselage positioning mechanism is operable to move the fuselage relative to the wing assembly in a longitudinal direction parallel to the longitudinal axis between a fuselage maximum forward position and a fuselage maximum aft position. When the aircraft for flight, a position of a center of gravity of the aircraft relative to a center of lift is determined. The fuselage can be moved relative to the wing assembly to bring the center of gravity within an allowable range of distances from the center of lift to balance the aircraft for flight. The fuselage positioning mechanism can be automated to allow adjustment of the fuselage position during the flight of the aircraft.

9 Claims, 8 Drawing Sheets

(56) References Cited

U.S. PATENT DOCUMENTS

| | | | | |
|---|---|---|---|---|
| 2,683,574 | A * | 7/1954 | Peterson | B64C 3/40 |
| | | | | 244/46 |
| 3,381,918 | A * | 5/1968 | Jacquart | B23D 15/14 |
| | | | | 244/46 |
| 3,405,891 | A | 10/1968 | Jacquart et al. | |
| 4,139,172 | A | 2/1979 | Miller et al. | |
| 7,185,847 | B1 * | 3/2007 | Bouchard | F42B 10/12 |
| | | | | 244/3.28 |
| 7,510,143 | B1 * | 3/2009 | Bertelsen | B64C 3/385 |
| | | | | 244/46 |
| 8,567,105 | B1 | 10/2013 | Bobro | |
| 9,957,035 | B2 * | 5/2018 | Valasek | B64C 1/22 |
| 10,046,850 | B2 * | 8/2018 | Gamble | B64C 1/26 |

\* cited by examiner

MOVABLE WING FOR WEIGHT AND BALANCE MANAGEMENT

TECHNICAL FIELD

The present disclosure relates generally to aircraft and, more particularly, to aircraft having movable wings for weight and balance management by shifting the center of gravity of the aircraft relative to the center of lift to compensate for the weight and position of a payload without the need or with a reduced need for ballast.

BACKGROUND

An aircraft's weight and balance are the most critical factors affecting its flight safety. An aircraft whose center of gravity (COG) is outside allowable limits relative to the aircraft's center of lift (COL) is both inefficient and dangerous to fly. The responsibility for proper weight and balance control begins with the engineers and designers who design the aircraft, and extends to the aviation technician that maintains the aircraft, the loadmaster that is responsible for loading a payload and fuel aboard the aircraft, and ultimately to the pilot that operates the aircraft Two elements are vital in an aircraft's weight and balance determinations: the total weight of the aircraft that must be no greater than the maximum gross weight allowable for the particular make and model of the aircraft and the particular types of flight operations that it is to undertake; and the location of its center of gravity, or the point at which all of the weight of the aircraft is considered to be concentrated, relative to its center of lift or mean aerodynamic chord, which must be maintained within the range allowable for the particular operational weight of the aircraft. Weight and center of gravity determine aircraft stability, control, performance and other flight characteristics. In previously-known aircraft, when the center of gravity is outside the allowable range relative to the center of lift, ballast is added to balance the aircraft. The ballast has a weight and is located in a position within the aircraft that will shift the center of gravity to a position within the allowable range with respect to the center of lift. Despite balancing the aircraft, ballast negatively impacts payload and fuel carrying capacity when the aircraft is up against maximum takeoff weight limits. Increase in aircraft weight without a positive impact to fuel or payload capacity produces a net decrease in aircraft capability and efficiency.

SUMMARY OF THE DISCLOSURE

In one aspect of the present disclosure, an aircraft is disclosed. The aircraft includes a fuselage having a longitudinal axis, a wing assembly, and a fuselage positioning mechanism operatively connecting the fuselage to the wing assembly. The fuselage positioning mechanism is operable to move the fuselage relative to the wing assembly in a longitudinal direction parallel to the longitudinal axis between a fuselage maximum forward position and a fuselage maximum aft position.

In another aspect of the present disclosure, a method for balancing an aircraft is disclosed. The aircraft includes a fuselage and a wing assembly mounted thereon for movement of the fuselage relative to the wing assembly in a longitudinal direction that is parallel to a longitudinal axis of the fuselage between a fuselage maximum forward position and a fuselage maximum aft position. The method includes preparing the aircraft for flight, determining a position of a center of gravity of the aircraft along the longitudinal axis, determining whether the center of gravity is within an allowable range of longitudinal distances from a center of lift of the aircraft, and adjusting a longitudinal position of the fuselage to bring the center of gravity within the allowable range of longitudinal distances from the center of lift in response to determining that the center of gravity is not within the allowable range of longitudinal distances from the center of lift.

In a further aspect of the present disclosure, a fuselage positioning mechanism for moving a fuselage of an aircraft relative to a wing assembly of the aircraft in a longitudinal direction that is parallel to a longitudinal axis of the fuselage is disclosed. The fuselage positioning mechanism includes a fuselage positioning rail mounted on the fuselage and parallel to the longitudinal axis, and a cam bracket assembly mounted on the fuselage positioning rail and movable thereon between a plurality of discrete positions in the longitudinal direction. The cam bracket assembly is operatively connected to the wing assembly so that movement of the cam bracket assembly along the fuselage positioning rail facilitates movement of the fuselage in the longitudinal direction between a fuselage maximum forward position and a fuselage maximum aft position.

Additional aspects are defined by the claims of this patent.

DETAILED DESCRIPTION

Figure 1:
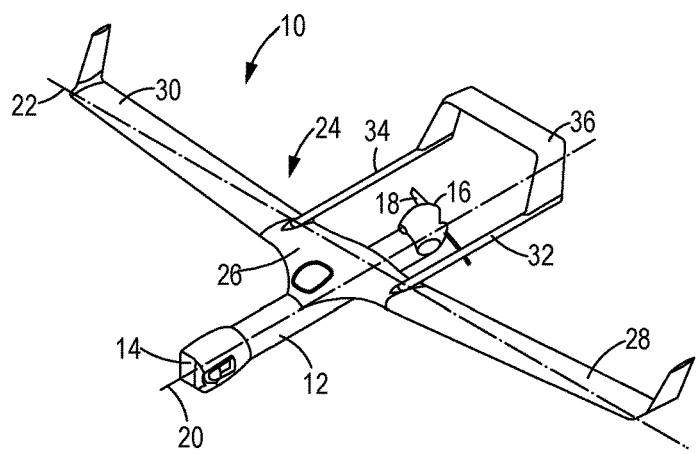
FIG. 1 is an isometric view of an aircraft with a fuselage and a wing assembly in accordance with the present disclosure.

FIG. 1 illustrates an exemplary aircraft 10 in the form of an unmanned aerial vehicle (UAV) 10, or a drone, in which a movable fuselage in accordance with the present disclosure may be implemented. In the illustrative example, the aircraft 10 may include a fuselage 12 with a nose 14 at the forward end and a tail 16 with an engine housing at the aft end to drive a propeller 18 and generate thrust for the aircraft 10. A longitudinal axis 20 passes through the fuselage 12 from the nose 14 to the tail 16, and a transverse axis 22 perpendicular to the longitudinal axis 20 extends from wing tip to wing tip. The aircraft 10 further includes a wing assembly 24 formed by a center wing 26 having a left wing 28 and a right wing 30 extending outward there from in the transverse direction, and a left boom 32 and a right boom 34 extending rearward and having a tail wing 36 mounted there between. The fuselage 12 may be mounted to the wing assembly 24 in a manner that allows the fuselage 12 to be moved forward and rearward parallel to the longitudinal axis 20. The position of the fuselage 12 may be used to balance the aircraft 10 and place the center of gravity of the aircraft 10 within the allowable range of distances from the center of lift created by the wing assembly 24 when a payload is added to or removed from the aircraft 10 that would shift the center of gravity to a position where the center of gravity of the aircraft 10 is too far forward of or too far aft of the center of lift.

Figure 2:
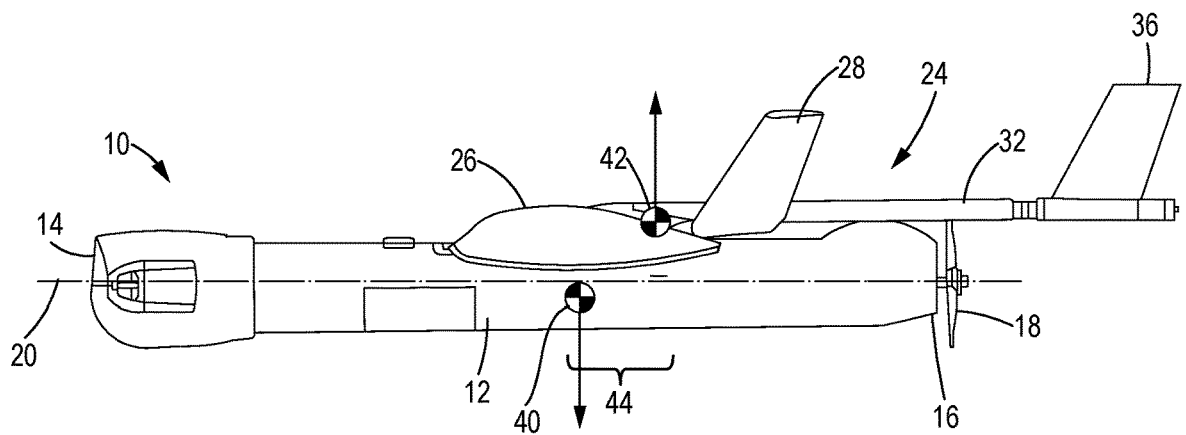
FIG. 2 is a side view of the aircraft of FIG. 1 without a payload and with the fuselage in a first longitudinal position relative to the wing assembly.
Figure 3:
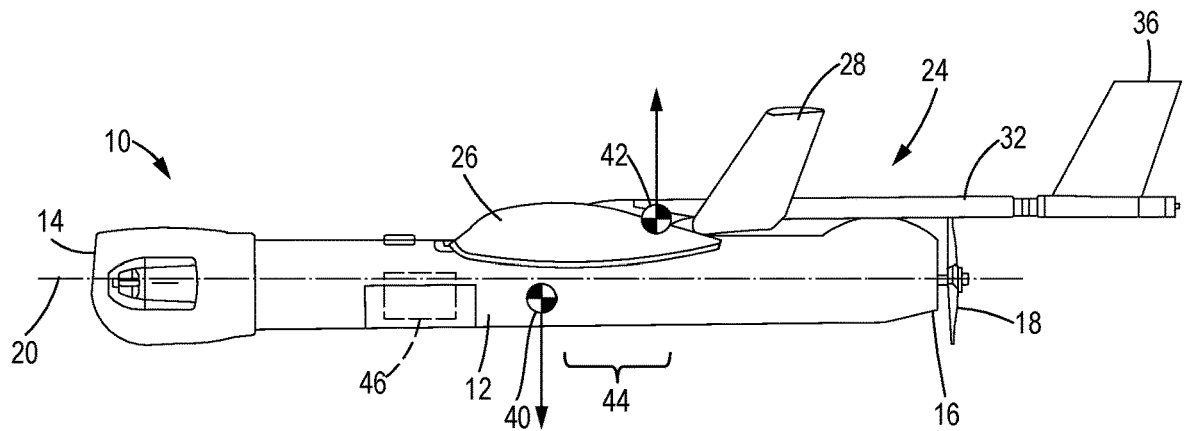
FIG. 3 is a side view of the aircraft of FIG. 1 with a payload within the fuselage and the fuselage in the first longitudinal position.
Figure 4:
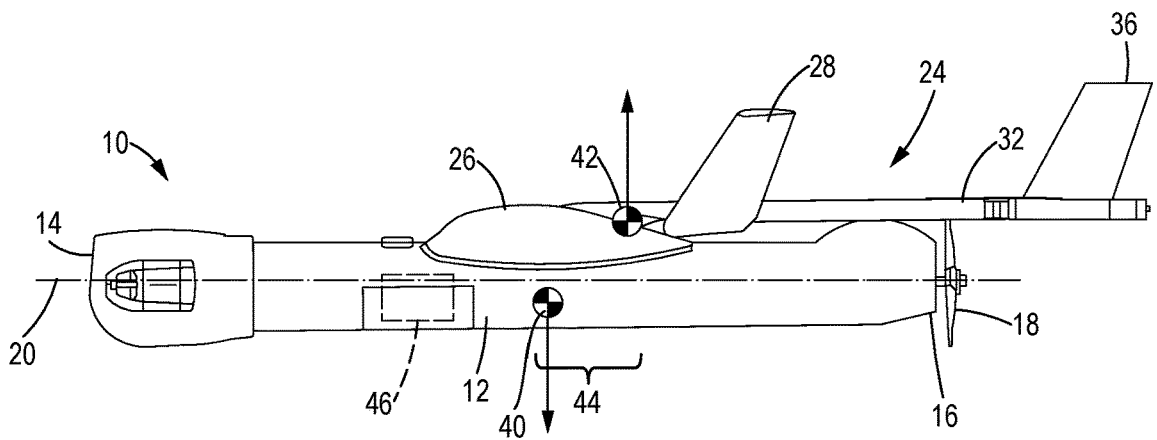
FIG. 4 is a side view of the aircraft of FIG. 1 with a payload within the fuselage and the fuselage in a second longitudinal position relative to the wing assembly.

FIGS. 2-4 illustrate the operational principles of positioning the fuselage 12 relative to the wing assembly 24 in accordance with the present disclosure. FIG. 2 may represent the aircraft 10 prior to adding a payload to be transported during flight. A center of gravity 40 of the aircraft 10 is positioned along the longitudinal axis 20 and centered on the transverse axis 22 for the sake of clarity in the present example. A center of lift 42 for the aircraft 10 occurs where the sum total of all lift generated by components of the aircraft 10 balances out. The center of lift 42 is principally dictated by lift from the wings 26, 28, 30, 38, but other control surfaces and aerodynamic parts of the fuselage 12 contribute to the magnitude and location of the center of lift 42 as well. In this example, the center of lift 42 is in a known location in the wing assembly 24. The position of the center of gravity 40 relative to the center of lift 42 will determine the flight characteristics of the aircraft 10. In general, the center of gravity 40 should be positioned along the longitudinal axis 20 within an allowable range 44 of longitudinal distances from the center of lift 42. Longitudinal positions of the center of gravity 40 outside of the allowable range 44 would result in unstable flight. As shown in FIG. 2, with the wing assembly 24 in a first longitudinal position, the center of gravity 40 is forward of the center of lift 42 but within the allowable range 44.

FIG. 3 illustrates the aircraft 10 after a payload 46 has been loaded into the fuselage 12. The payload 46 is forward of the position of the center of gravity 40 when the aircraft 10 was empty as shown in FIG. 2. As illustrated, the payload 46 has sufficient mass to shift the center of gravity 40 forward along the longitudinal axis 20 and outside the allowable range 44 for the center of gravity 40 relative to the center of lift 42. Normally in previous aircraft where the longitudinal position of the fuselage is fixed relative to the wings, ballast would be added to the aircraft behind the center of gravity 40 to move the center of gravity 40 rearward to balance the aircraft and achieve the desired flight characteristics. The balancing is performed at the cost of decreased fuel efficiency due to the extra weight of the ballast. However, in the aircraft 10 in accordance with the present disclosure, the fuselage 12 and, correspondingly, the center of gravity 40 can be moved aft along the longitudinal axis 20 via an appropriate fuselage positioning mechanism in accordance with the present disclosure to the position shown in FIG. 4 where the center of gravity 40 is again within the allowable range 44 with respect to the center of lift 42. As a result, the aircraft 10 may have the desired performance without sacrificing fuel efficiency due to the additional weight of the ballast.

Figure 6:
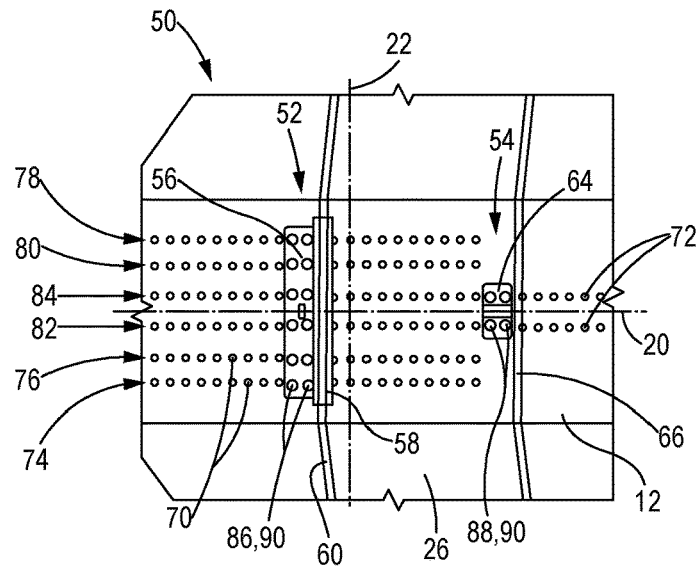
FIG. 6 is a top view of the central portion of the aircraft of FIG. 1 with the central wing being transparent to reveal the fuselage positioning mechanism of FIG. 5.
Figure 5:
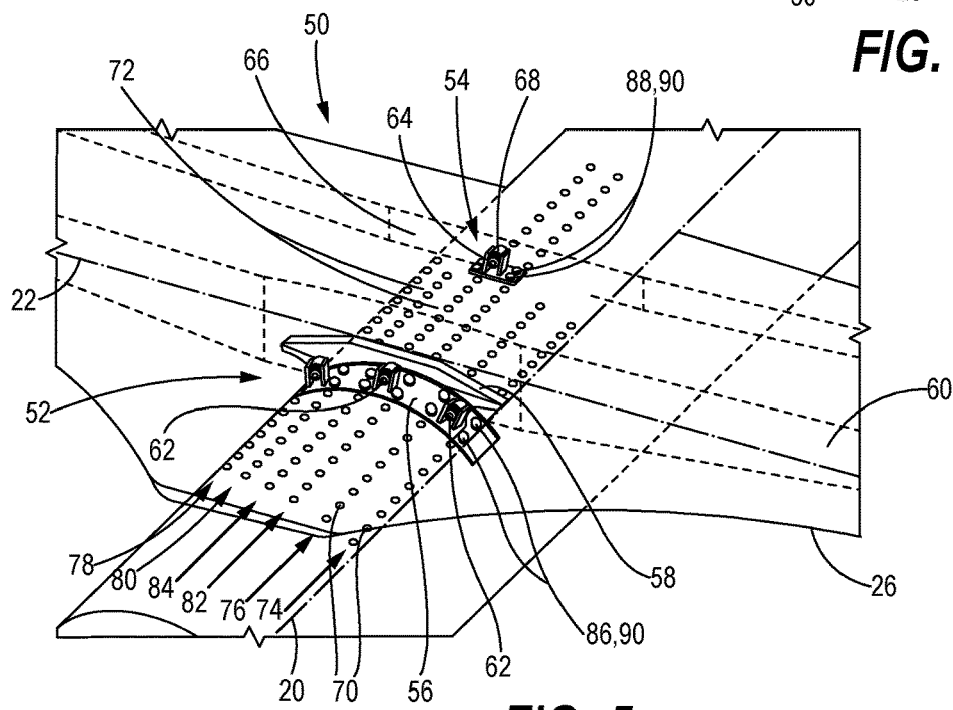
FIG. 5 is an enlarged isometric view of a central portion of the aircraft of FIG. 1 with a central wing being transparent to reveal an embodiment of a fuselage positioning mechanism in accordance with the present disclosure.

FIGS. 5 and 6 illustrate a first embodiment of the aircraft 10 with a fuselage positioning mechanism 50 allowing for adjustment of the longitudinal position of the fuselage 12 relative to the wing assembly 24. Referring to FIG. 5, the center wing 26 is transparent to expose the components of the fuselage positioning mechanism 50. The illustrated fuselage positioning mechanism 50 includes a forward wing connection assembly 52 and an aft wing connection assembly 54. The forward wing connection assembly 52 includes a fuselage bracket 56 shaped to match the contour of the outer surface of the fuselage 12, and a wing rib 58 mounted thereon. The wing rib 58 is in turn mounted to a support structure of the center wing 26 such as a center wing forward bulkhead 60 so that the forward wing connection assembly 52 is stationary with respect to the wing assembly 24. The wing rib 58 may be connected to the fuselage bracket 56 by two or more sheer pins 62. The aft wing connection assembly 54 includes an aft sheer pin bracket 64 connected to a support structure of the center wing 26 such as a center wing aft bulkhead 66 by one or more sheer pins 68 so that the aft wing connection assembly 54 is also stationary with respect to the wing assembly 24. With this arrangement, the sheer pins 62, 68 may carry all of the sheer loads created during the flight of the aircraft 10 by forces on the fuselage 12 and the wing assembly 24 tending to move the components in opposite directions.

The position of the fuselage 12 can be varied by providing rows of apertures 70, 72 through the fuselage 12 that are aligned parallel to the longitudinal axis 20. As best seen in the top view of FIG. 6, the fuselage bracket mounting apertures 70 are arranged in two rows 74, 76 on the left side of the fuselage 12, and two rows 78, 80 on the right side of the fuselage 12. The sheer pin bracket apertures 72 are arranged in two rows 82, 84 on the top of the fuselage 12 and straddling a center line of the fuselage 12. Corresponding apertures 86, 88 on the fuselage bracket 56 and the aft sheer pin bracket 64 are spaced to align with the apertures 70, 72 at a plurality of discrete positions at which the wing assembly 24 can be mounted to the fuselage 12. Fasteners 90 may extend out from the interior of the fuselage 12 through the apertures 70, 72, 86, 88 when the fuselage 12 is positioned so that the wing assembly 24 can be attached with minimal space being occupied within the fuselage 12 and to prevent damage to components within the fuselage 12.

When a payload 46 (FIGS. 3 and 4) is placed within the fuselage 12, ground personnel preparing the aircraft 10 for flight may assess and determine whether the position of the center of gravity 40 of the aircraft 10 has shifted along the longitudinal axis 20 and, if so, whether the shifted center of gravity 40 of the aircraft 10 is within the allowable range 44 of distances from the center of lift 42. As discussed above, in previous aircraft, additional ballast is placed in the fuselage 12 to counterbalance the payload and move the aircraft's center of gravity back to within an allowable distance from the center of lift. With the fuselage positioning mechanism 50 in accordance with the present disclosure, the need for ballast is reduced or eliminated by shifting the center of gravity 40 of the aircraft 10 toward the center of lift 42 of the wing assembly 24 to balance the forces during flight without further increasing the weight of the aircraft 10. For example, if the payload is placed forward of the normal center of gravity 40 of the aircraft 10, the fuselage 12 may be moved aft and secured at the aft-most apertures 70, 72 to reposition the center of gravity 40, and vice versa. If the center of gravity 40 of the aircraft 10 is still outside the allowable range 44 from the center of lift 42 after the fuselage is moved to the maximum forward or aft position, the payload 46 may be repositioned within the fuselage 12 or ballast may be added, though the amount of ballast will likely be less than that required in a comparable aircraft where the position of the fuselage 12 cannot be adjusted.

Figure 7:
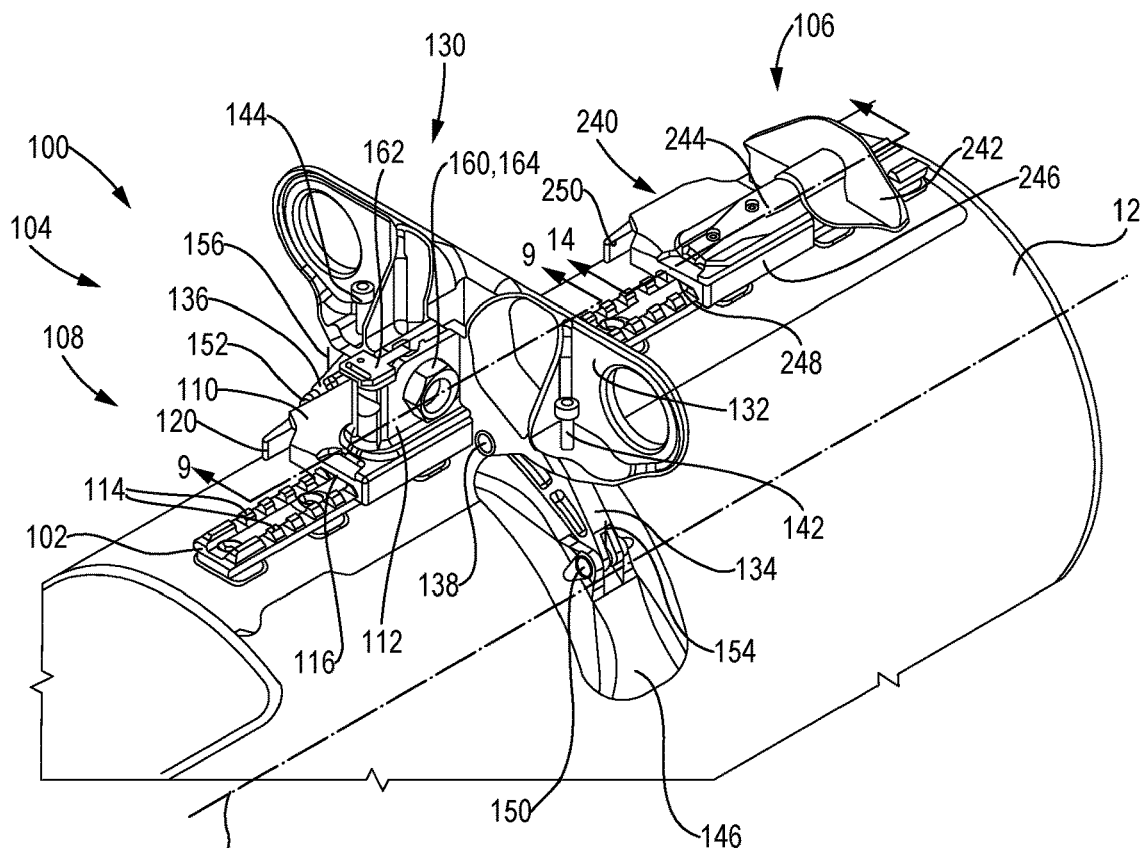
FIG. 7 is an enlarged isometric view of the central portion of the aircraft of FIG. 1 with the wing assembly removed to reveal an alternative embodiment of a fuselage positioning mechanism in accordance with the present disclosure.
Figure 8:
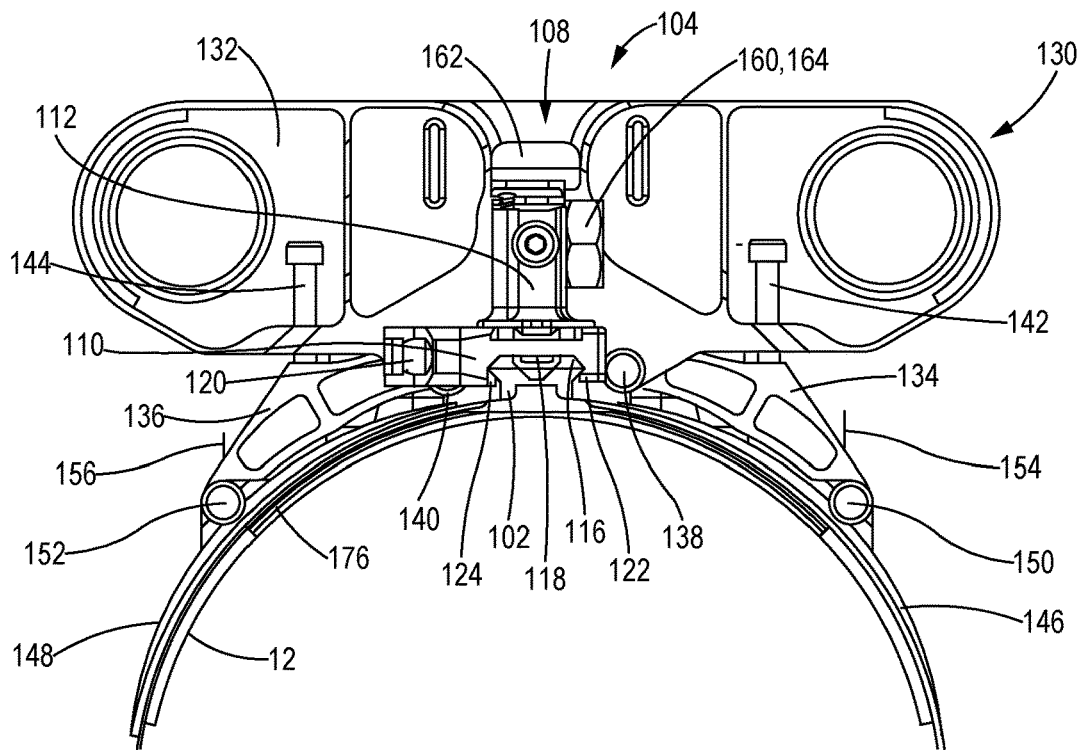
FIG. 8 is a front view of the central portion of the aircraft of FIG. 1 with the wing assembly removed to reveal the fuselage positioning mechanism of FIG. 7.

FIGS. 7 and 8 illustrate an alternative embodiment of a fuselage positioning mechanism 100 that allows for adjustment of the location of the fuselage 12 between a plurality of discrete positions without the need for access to the interior of the fuselage 12 to remove and reinstall the fasteners 90 of the fuselage positioning mechanism 50. The fuselage positioning mechanism 100 utilizes a rail system, such as a picatinny rail system, mounted to the top of the fuselage 12. Referring to FIG. 7, where the wing assembly 24 is removed for clarity, the fuselage positioning mechanism 100 as illustrated includes a fuselage positioning rail 102 mounted on the fuselage 12, a forward wing connection assembly 104 at the forward end of the fuselage positioning mechanism 100, and an aft wing connection assembly 106 at the aft end of the fuselage positioning mechanism 100. The forward wing connection assembly 104 includes a cam bracket assembly 108 having a cam bracket mount 110 that is slidable on the positioning rail 102, and a cam bracket 112 mounted thereon. The positioning rail 102 has a plurality of teeth 114 arranged in and evenly spaced along two rows parallel to the longitudinal axis 20 of the fuselage 12. The positioning rail 102 has a generally T-shaped cross-section (FIG. 8) with beveled lateral edges that is received and engaged by a rail groove 116 of the cam bracket mount 110 having a complimentary shape to the positioning rail 102 with lateral jaws engaging the beveled lateral edges so the cam bracket assembly 108 can slide along the positioning rail 102 but not be lifted off of the positioning rail 102. The rows of teeth 114 are spaced in the transverse direction to accommodate fasteners 118 securing the cam bracket 112 to the cam bracket mount 110 that may extend into the rail groove 116. The cam bracket assembly 108 is slidable on the positioning rail 102 in the longitudinal direction, and the cam bracket mount 110 further includes a cam bracket assembly locking mechanism that can selectively engage and disengage the positioning rail 102 to lock or unlock the cam bracket assembly 108 in place in a manner discussed more fully below. Locking and unlocking of the cam bracket assembly locking mechanism is controlled by a cam bracket mount release lever 120 that is shown in a locked position in FIGS. 7 and 8.

The forward wing connection assembly 104 further includes a center wing sway rib assembly 130 that is connected to the support structure of the center wing 26, such as to the center wing forward bulkhead 60 discussed above, and is selectively engaged by the cam bracket assembly 108 to position the fuselage 12 relative to the wing assembly 24 along the longitudinal axis 20. The center wing sway rib assembly 130 as shown includes a center wing sway rib 132 that is connected to the center wing forward bulkhead 60 or other support structure of the center wing 26. The center wing sway rib 132 is configured to be engaged by and locked onto the cam bracket 112 such as in the manner described more fully below. A left sway bar 134 and a right sway bar 136 are pivotally connected to the center wing sway rib 132 by corresponding pins 138, 140 defining rotational axes of the sway bars 134, 136. The rotation of the sway bars 134, 136 toward the center wing sway rib 132 may be controlled by sway bar limit bolts 142, 144, respectively, that are received in threaded apertures (not shown) of the center wing sway rib 132 and extend outwardly beyond a bottom surface of the center wing sway rib 132.

At ends of the sway bars 134, 136 opposite the pins 138, 140, a left sway pad 146 and a right sway pad 148 (FIG. 8) are rotatably connected to the sway bars 134, 136 by pins 150, 152. The sway pads 146, 148 have concave surfaces facing and engaging the fuselage 12 and having shapes that are complementary to the exterior surface of the fuselage 12. The pins 150, 152 define rotational axes of the sway pads 146, 148 that are parallel to the rotational axes of the sway bars 134, 136 defined by the pins 138, 140. The pins 150, 152 may have torsion springs 154, 156, respectively, wrapped there about. The torsion springs 154, 156 engage the sway pads 146, 148 in a manner that biases the sway pads 146, 148 apart to receive the fuselage 12 for simple assembly of the fuselage 12 and the wing assembly 24. With this arrangement, the sway pads 146, 148 engage the outer surface of the fuselage 12 so that the center wing sway rib 132 is disposed above the positioning rail 102. The sway bar limit bolts 142, 144 may be adjusted to set the center wing sway rib 132 at a desired height above the positioning rail 102. With this configurations, the longitudinal position of the wing assembly 24 may be adjusted by sliding the sway pads 146, 148 along the exterior surface of the fuselage 12 until the wing assembly 24 is in the desired position.

The cam bracket assembly 108 and the center wing sway rib assembly 130 are configured to be locked together to lock the fuselage 12 in position relative to the wing assembly 24, and to be unlocked and separable during repositioning of the fuselage 12. The locking and unlocking of the assemblies 108, 130 are controlled from the exterior of the cam bracket 112 by a cam lock 160 and an associated cam latch lever 162 in the illustrated embodiment. The cam lock 160 has a cam lock hex head 164 extending outwardly from the cam bracket 112. The cam lock hex head 164 is configured to be engaged by a tool (not shown) capable of applying torque to rotate the cam lock 160 between locked and unlocked positions. The cam lock hex head 164 is hexagonal so that a box wrench, adjustable spanner, socket wrench or the like can be attached and apply torque. The cam lock hex is 164 may have any other appropriate configuration allowing engagement by an appropriate tool and rotation between the locked and unlocked positions.

Figure 9:
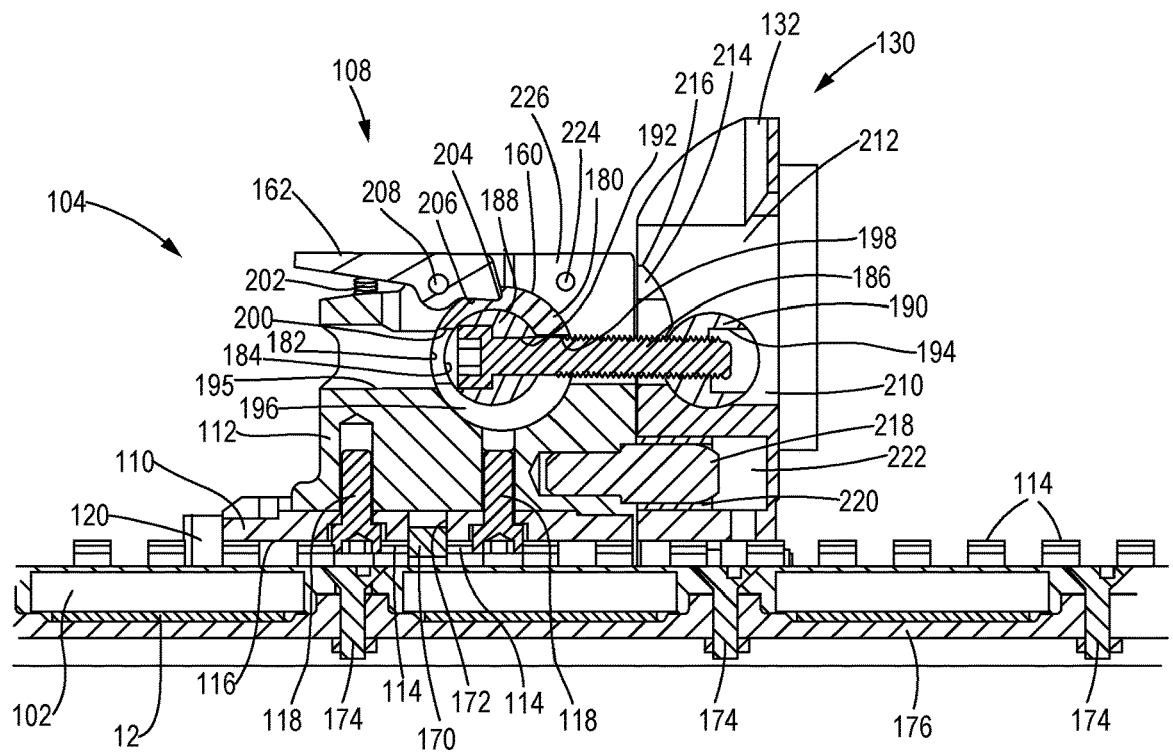
FIG. 9 is a cross-sectional view of the central portion of the aircraft taken through line 9-9 of FIG. 7 and showing a forward wing connection assembly of the fuselage positioning mechanism of FIG. 7 with a cam bracket assembly locked to a center wing sway rib assembly and to a fuselage positioning rail.

FIG. 9 is a cross-sectional view of the cam bracket assembly 108, the center wing sway rib assembly 130, and corresponding portions of the fuselage 12 and the positioning rail 102. In this figure, the cam bracket assembly 108 engages and is locked to the center wing sway rib assembly 130. The cam bracket mount release lever 120 is in its locked position so that the cam bracket assembly 108 cannot slide along the positioning rail 102. The cam bracket mount release lever 120 is operatively connected to a mount locking bar 170 that is disposed and slidable within a locking bar slot 172 of the cam bracket mount 110. When the cam bracket mount release lever 120 moves to its locked position, the mount locking bar 170 slides downward and is disposed between adjacent teeth 114 of the positioning rail 102 to fix the cam bracket assembly 108 in the position of FIG. 9. As further illustrated in FIG. 9, the positioning rail 102 is secured to the fuselage 12 by a plurality of fasteners 174, and a rail backing plate 176 may be attached at the interior surface of the fuselage 12 to provide additional structural support to the fuselage 12.

The locking mechanism of the cam bracket mount 110 is exemplary, and alternative locking mechanism are contemplated by the inventors. For example, U.S. Pat. No. 8,567, 105 issued to Bobro on Oct. 29, 2013, discloses an interface mounting device configured for attachment to a rail such as the fuselage positioning rail 102 illustrated and described herein. When the cam bracket mount 110 is configured as an interface mounting device according to the Bobro patent, one of the jaws 122 (FIG. 8) engaging the positioning rail 102 is fixed relative to the cam bracket mount 110 and the other jaw 124 (FIG. 8) is a movable clamp jaw 124 that is operatively connected to the cam bracket mount release lever 120. When the cam bracket mount release lever 120 is in the locked position, the movable clamp jaw 124 is locked in place and engaging the positioning rail 102 to retain the cam bracket assembly 108 on the positioning rail 102. When the cam bracket mount release lever 120 is in the unlocked position, the movable clamp jaw 124 is free to retract into the cam bracket mount 110 and release the positioning rail 102 so the cam bracket assembly 108 can be rotated off the positioning rail 102. In this embodiment, the mount locking bar 170 is permanently fixed in the downward position of FIG. 9 and inserted between the adjacent teeth 114 when the fixed jaw 122 engages the positioning rail 102 and the cam bracket assembly 108 is rotated to engage the positioning rail 102 with the movable clamp jaw 124, thereby maintaining the cam bracket assembly 108 fixed along the positioning rail 102 and the longitudinal axis 20. Further alternative cam bracket mount configurations are contemplated.

The cam lock 160 includes a cam lock cylindrical body 180 extending from the cam lock hex head 164 (not shown) and disposed and rotatable within a cam bracket through bore 182 of the cam bracket 112. The cam lock cylindrical body 180 has a cam lock body through bore 184 that is offset with respect to a longitudinal center of the cam lock cylindrical body 180 so that a position of the cam lock body through bore 184 along the longitudinal axis 20 of the fuselage 12 will vary as the cam lock cylindrical body 180 rotates within the cam bracket through bore 182. A cam lock arm 186 extends between a cam lock barrel washer 188 and a cam lock head washer 190. The cam lock arm 186 has a head at one end, a threaded portion at the opposite end and a shank portion there between. The cam lock barrel washer 188 has a barrel washer through bore 192 through which the threaded and shank portions of the cam lock arm 186 pass, and which engages the head of the cam lock arm 186. The cam lock head washer 190 has an internally threaded head washer through bore 194 that receives the threaded portion of the cam lock arm 186. The washers 188, 190 may also have openings for set screws (not shown) that may be tightened to engage and lock the cam lock arm 186 in position within the through bores 192, 194 to maintain a desired separation between the washers 188, 190. To adjust the distance between the washers 188, 190 and the tension that exist in the cam lock arm 186 when the assemblies 108, 130 are locked together, the set screws may be loosened and a tool such as a screwdriver or socket wrench may be inserted through an access opening 195 in the cam bracket 112 to rotate the cam lock arm 186 in the appropriate direction for the threads to move the cam lock head washer 190 toward or away from the cam lock barrel washer 188.

The cam lock barrel washer 188 is disposed and rotatable within the cam lock body through bore 184. However, the configuration of the cam lock cylindrical body 180 will dictate the amount of rotation of the cam lock barrel washer 188, and correspondingly the cam lock arm 186 and the cam lock head washer 190. The threaded and shank portions of the cam lock arm 186 extend through a cam lock arm slot 196 extending circumferentially around the cam lock cylindrical body 180 by more than 180° from a locking surface 198 to an unlocked surface 200. As shown, the locking surface 198 is disposed above the cam lock arm 186 when the cam bracket assembly 108 is locked. In this position, the locking surface 198 prevents the cam lock arm 186 and the cam lock barrel washer 188 from rotating in the counter-clockwise direction as shown. At the same time, the cam lock arm 186 prevents the cam lock 160 from rotating further in the clockwise direction and losing the clamp between the cam bracket assembly 108 and the center wing sway rib 132 due to the offset of the cam lock body through bore 184 and movement of the cam lock barrel washer 188 back toward the center wing sway rib 132. The cam lock 160 is held in the locked position by the cam latch lever 162 that is rotated clockwise as shown by a cam latch lever spring 202 so that a cam latch lever tip 204 is disposed in a lock notch 206 in the exterior surface of the cam lock cylindrical body 180. The cam latch lever 162 may be rotatably mounted to the cam bracket 112 by a spring pin 208 or other appropriate pivot mechanism.

The center wing sway rib 132 is configured to receive the cam lock arm 186 and the cam lock head washer 190 to secure the center wing sway rib assembly 130 to the cam bracket assembly 108. The center wing sway rib 132 has a cam lock receiving slot 210 having a head washer receiving portion 212 having a width that is greater than the width of the cam lock head washer 190, and a lock arm receiving portion 214 having a width that is less than the width of the cam lock head washer 190 but greater than an outer diameter of the threaded portion of the cam lock arm 186. A transition between the head washer receiving portion 212 and the lock arm receiving portion 214 defines a head washer engagement surface 216 engaging the cam lock head washer 190 to prevent the cam lock head washer 190 from being pulled through the lock arm receiving portion 214.

In the locked position as shown in FIG. 9, the engagement between the cam bracket assembly 108 and the positioning rail 102, and between the cam bracket assembly 108 and the center wing sway rib assembly 130, will lock the center wing sway rib 132 and, correspondingly, the fuselage 12 and the wing assembly 24 in a fixed position along the longitudinal axis 20. During flight, forces on the fuselage 12 and the wing assembly 24 can tend to cause the cam bracket 112 and the center wing sway rib 132 to move in opposite directions relative to each other perpendicular to the longitudinal axis 20. In this situation, shear stresses on the cam lock arm 186 traversing the interface between the cam bracket 112 and the center wing sway rib 132 are prevented by providing a forward shear pin 218 extending rearward from the cam bracket 112 and received within a bushing 220 within a shear pin bore 222 of the center wing sway rib 132. When the forces are applied to the cam bracket 112 and the center wing sway rib 132, substantially all of the force and the corresponding shear stresses are carried by the forward shear pin 218.

Figure 10:
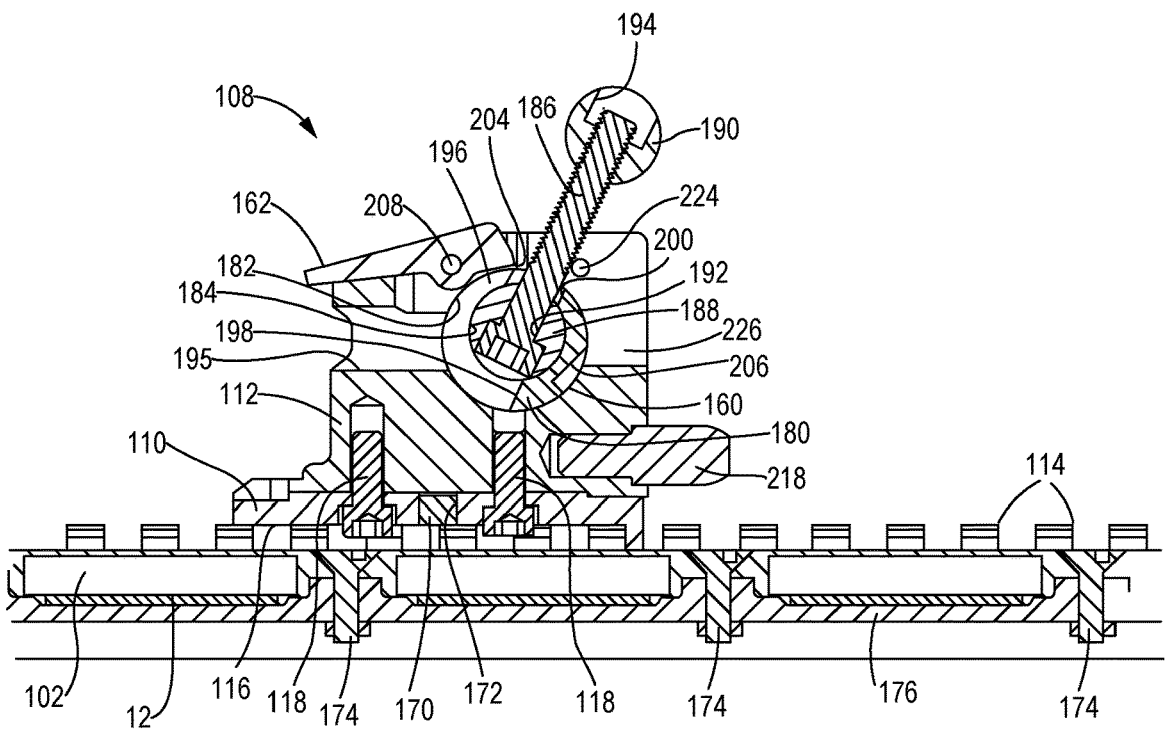
FIG. 10 is the cross-sectional view of the aircraft of FIG. 9 with the cam bracket assembly unlocked from the center wing sway rib assembly and unlocked from the fuselage positioning rail.

FIG. 10 illustrates the cam bracket assembly 108 unlocked and separated from the center wing sway rib assembly 130, which is omitted for clarity. The cam bracket assembly 108 is unlocked by rotating the cam latch lever 162 counterclockwise as shown about the spring pin 208 so the cam latch lever tip 204 disengages from the lock notch 206. The cam lock 160 has been engaged by an appropriate tool and rotated counterclockwise approximately 250° from the position shown in FIG. 9. As the cam lock 160 passed 180° of rotation, the cam lock barrel washer 188 was at a maximum aft position that provides clearance for the cam lock head washer 190 from the head washer engagement surface 216. As the cam lock 160 continues to rotate counterclockwise to the illustrated unlocked position, the unlocking surface 200 engages and lifts the cam lock arm 186 and the cam lock head washer 190 out of the cam lock receiving slot 210 and into the retracted position. The cam bracket 112 further includes a spring biased plunger 224 extending inwardly from a cam bracket sidewall 226 to form a detent engaging the cam lock arm 186 to maintain the cam lock arm 186 in the unlocked and retracted position.

Figure 11:
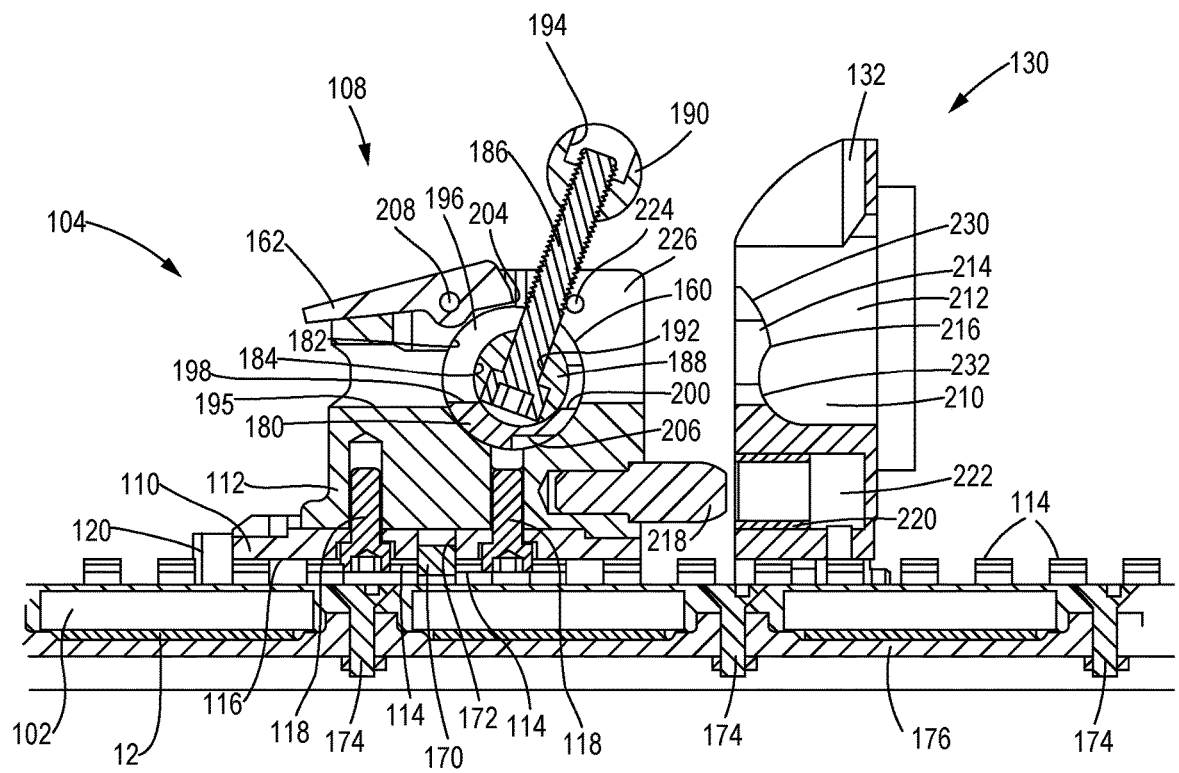
FIG. 11 is the cross-sectional view of the aircraft of FIG. 9 with the cam bracket assembly locked in position on the fuselage positioning rail and unlocked from the center wing sway rib assembly.

FIG. 10 also illustrates the cam bracket assembly 108 unlocked from the positioning rail 102. The cam bracket mount release lever 120 is moved to an unlocked position that is not visible in FIG. 10. The movement of the cam bracket mount release lever 120 causes the mount locking bar 170 to slide upward into the locking bar slot 172 and out of engagement with the teeth 114 of the positioning rail 102. With the Bobro patent mount described above, the cam bracket mount release lever 120 releases the movable clamp jaw 124 so that the cam bracket assembly 108 can be rotated off the positioning rail 102. It will be apparent to those skilled in the art that the cam bracket assembly 108 can be moved to any of a plurality of discrete positions where the mount locking bar 170 is aligned between adjacent teeth 114. For example, in FIG. 11, the cam bracket assembly 108 has been moved forward along the positioning rail 102 to a position where the mount locking bar 170 is aligned between a pair of adjacent teeth 114. With the cam bracket assembly 108 in position, the cam bracket mount release lever 120 is moved back to the locked position to cause the mount locking bar 170 to slide down between the adjacent teeth 114 or to lock the movable clamp jaw. With the cam bracket assembly 108 locked in place, the center wing sway rib assembly 130 along with the wing assembly 24 are being slid along the fuselage 12 toward the cam bracket assembly 108, or vice versa.

Figure 12:
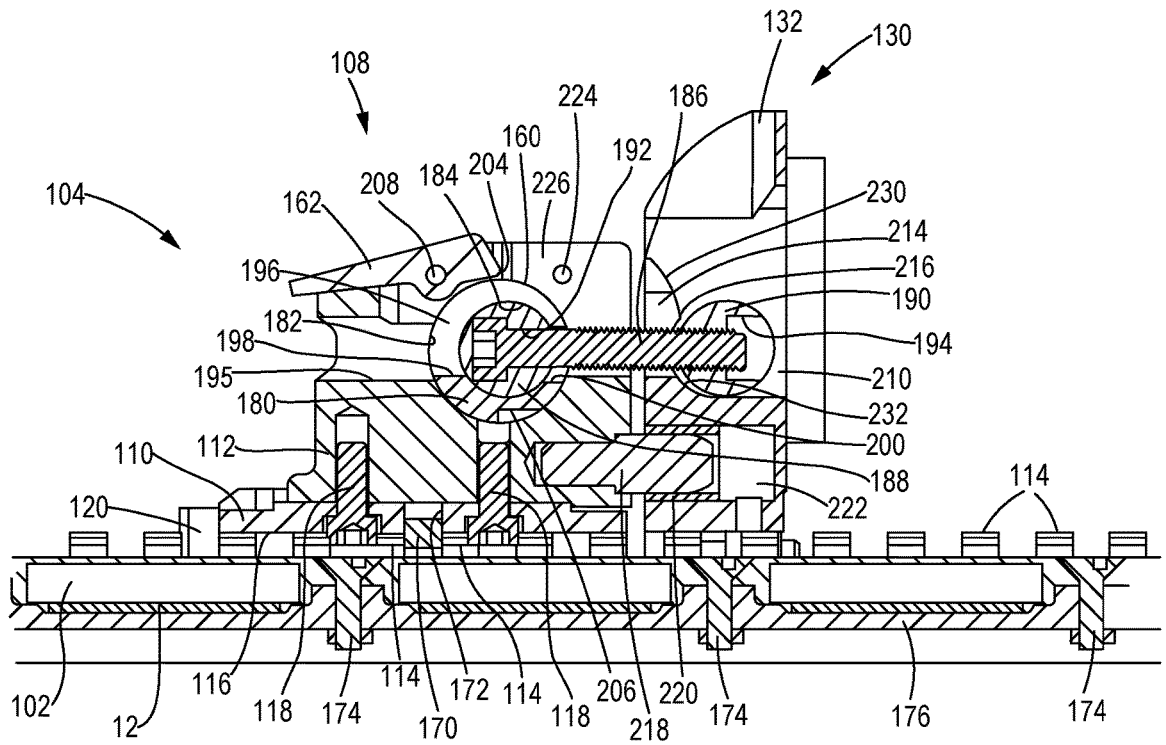
FIG. 12 is the cross-sectional view of the aircraft of FIG. 9 with the cam bracket assembly locked in position on the fuselage positioning rail and in a first stage of locking onto the center wing sway rib assembly.

In FIG. 12, the cam bracket assembly 108 is in a first stage of locking onto the center wing sway rib assembly 130. The cam lock arm 186 has been pushed past the plunger 224 and rotated clockwise into the cam lock receiving slot 210 of the center wing sway rib 132. As the cam lock arm 186 rotates, the cam lock head washer 190 is engaged by the head washer engagement surface 216. The head washer engagement surface 216 has an initial convex portion 230 that guides the cam lock head washer 190 to a concave portion 232. The concave portion 232 will engage and retain the cam lock head washer 190 when the cam lock 160 is tightened.

Figures 13, 14:
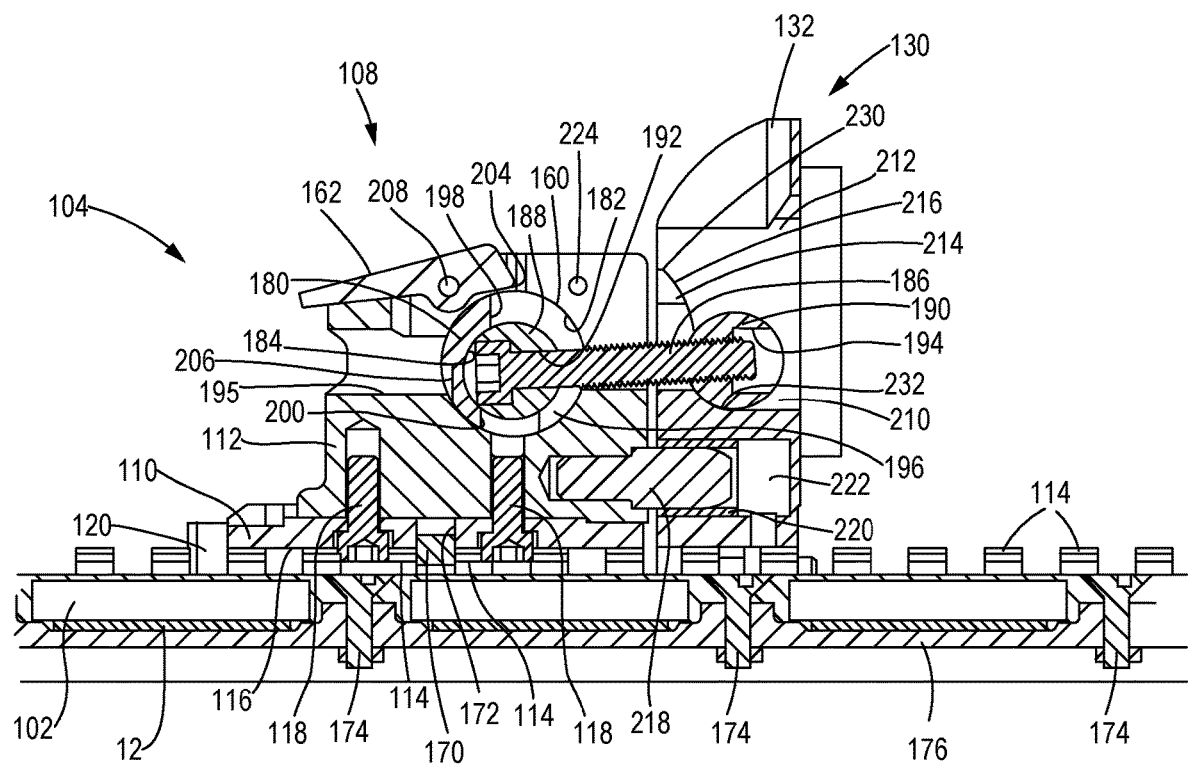
FIG. 13 is the cross-sectional view of the aircraft of FIG. 9 with the cam bracket assembly locked in position on the fuselage positioning rail and in an intermediate stage of locking onto the center wing sway rib assembly.
FIG. 14 is a cross-sectional view of the central portion of the aircraft taken through line 14-14 of FIG. 7 and showing an aft wing connection assembly of the fuselage positioning mechanism of FIG. 7.

FIG. 13 illustrates the cam bracket assembly 108 in an intermediate locking stage where the cam lock 160 has been rotated approximately 90° clockwise. Due to the offset of the cam lock body through bore 184, the cam lock arm 186 and the washers 188, 190 have moved longitudinally forward, and the cam lock head washer 190 is engaging the concave portion 232 of the head washer engagement surface 216 to draw the center wing sway rib assembly 130 toward the cam bracket assembly 108. Finally, returning to FIG. 9, the cam lock 160 is rotated to the fully locked position. The cam lock arm 186 and the washers 188, 190 are at the maximum forward position, and the locking surface 198 prevents the cam lock arm 186 from rotating in the counterclockwise direction. As the cam lock 160 rotated to the locked position, a leading edge of the lock notch 206 rotated past the cam latch lever tip 204, and the cam latch lever spring 202 rotated the cam latch lever 162 clockwise and the cam latch lever tip 204 into the lock notch 206 to prevent the cam lock 160 from rotating back in the counterclockwise direction toward the unlocked position.

Returning to FIG. 7, the aft wing connection assembly 106 works in conjunction with the forward wing connection assembly 104 to lock the wing assembly 24 in the desired position. The aft wing connection assembly 106 includes an aft shear pin bracket assembly 240 and a wing shear pin block 242. The aft shear pin bracket assembly 240 includes an aft shear pin bracket 244 mounted on a shear pin bracket mount 246. The shear pin bracket mount 246 may have a similar configuration as the cam bracket mount 110 with a rail groove 248 receiving the positioning rail 102 and a shear pin mount release lever 250 that is movable between locked and unlocked positions. As seen in the cross-sectional view of FIG. 14, the aft shear pin bracket 244 is secured to the shear pin bracket mount 246 by fasteners 118. A mount locking bar 252 is slidable within a locking bar slot 254 to move between the locked position disposed between adjacent teeth 114 as shown, and an unlocked position retracted within the locking bar slot 254 when the shear pin mount release lever 250 is moved to its unlocked position. With the Bobro patent mount, the mount locking bar 252 alternately locks and unlocks the movable clamp jaw 122. An aft shear pin 256 extends rearward from the aft shear pin bracket 244 and is received by a bushing 258 in a shear pin bore 260 of the wing shear pin block 242.

The wing shear pin block 242 is mounted on a structural component of the wing assembly 24, such as the center wing aft bulkhead 66. Consequently, the wing shear pin block 242 remains a fixed distance from the center wing sway rib 132. When the longitudinal position of the fuselage 12 is adjusted, and the cam bracket assembly 108 is repositioned along the positioning rail 102 and relocked, the aft shear pin bracket assembly 240 is moved the same distance along the positioning rail 102 when it is relocked and in position for the aft shear pin 256 to be received by the wing shear pin block 242. Similar to the cam bracket 112 and the center wing sway rib 132, forces on the fuselage 12 and the wing assembly 24 can tend to cause the aft shear pin bracket 244 and the wing shear pin block 242 to move in opposite directions relative to each other perpendicular to the longitudinal axis 20. When the forces are applied to the aft shear pin bracket 244 and the wing shear pin block 242, substantially all of the force and the corresponding shear stresses are carried by the aft shear pin 256. A gap is maintained between the aft shear pin bracket 244 and the wing shear pin block 242 to ensure that longitudinal loads are transmitted through the cam bracket assembly 108/center wing sway rib assembly 130 interface.

Figure 15:
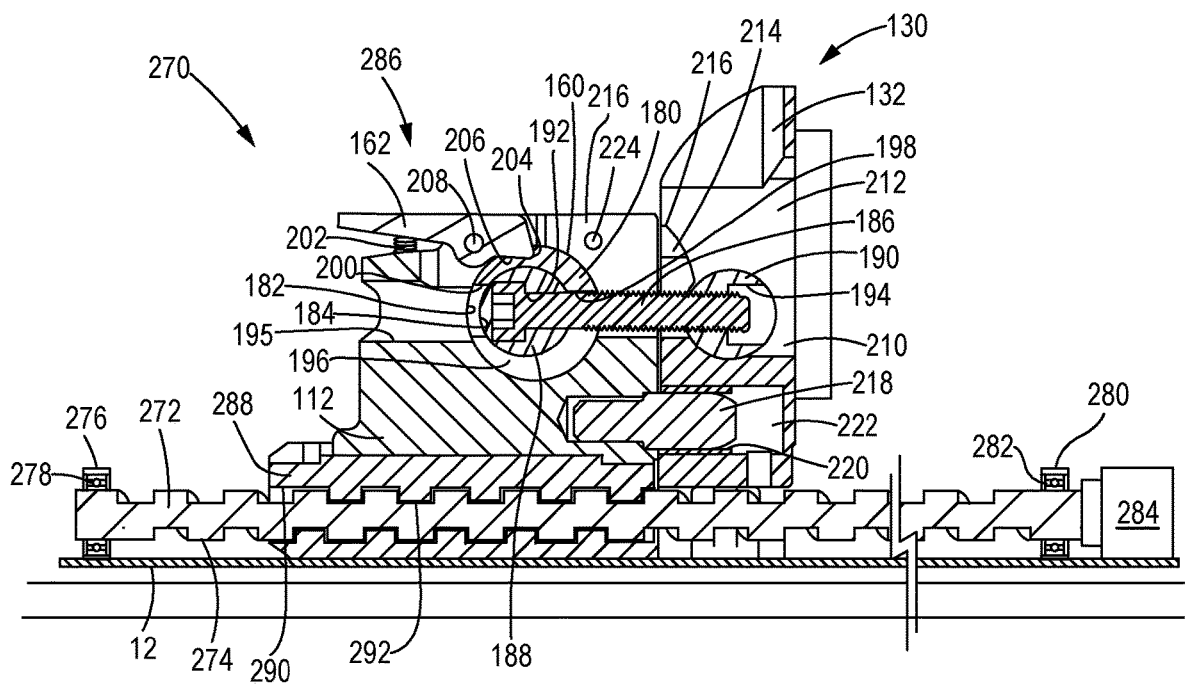
FIG. 15 is the cross-sectional view of the aircraft of FIG. 9 with a further alternative embodiment of a fuselage positioning mechanism having a screw shaft rotatably mounted on the fuselage and a forward wing connection assembly with a cam bracket assembly having a cam bracket mount receiving and engaging the screw shaft.

FIG. 15 illustrates a further alternative embodiment of a fuselage positioning mechanism 270 where adjustment of the longitudinal position of the fuselage 12 is automated and can enable adjustment of the position of the fuselage 12 when the aircraft 10 is airborne. In the fuselage positioning mechanism 270, the positioning rail 102 is replaced by a screw shaft 272 having external helical threads 274 and being mounted to the fuselage 12 by a forward screw bracket 276 having a forward shaft bearing 278 and an aft screw bracket 280 having an aft shaft bearing 282. The fuselage positioning mechanism 270 further includes a shaft drive device 284 mounted on the fuselage 12 and operably connected to the screw shaft 272. The shaft drive device 284 is actuatable to rotate the screw shaft 272 in either direction about a screw shaft rotational axis that is parallel to the longitudinal axis to cause the fuselage positioning mechanism 270 to move the fuselage 12 parallel to the longitudinal axis 20 in either direction. The shaft drive device 284 may be any appropriate drive mechanism capable of rotating the screw shaft 272 in a first screw shaft rotation direction and a second screw shaft rotation direction, such as a rotary actuator, stepper motor, servomotor and the like.

The fuselage positioning mechanism 270 further includes a cam bracket assembly 286 that is a modified version of the cam bracket assembly 108, and the center wing sway rib assembly 130 substantially as described above. In this embodiment, similar elements to those described above are identified using the same reference numerals. In the cam bracket assembly 286, the cam bracket 112 is mounted to a cam bracket mount 288 that is configured to receive and engage the screw shaft 272. The cam bracket mount 288 has a screw channel 290 extending longitudinally through the cam bracket mount 288. The cam bracket assembly 286 may include positioning devices (not shown) similar to the sway bars 134, 136 and the sway pads 146, 148 of the center wing sway rib assembly 130 that engage the fuselage 12 to maintain the cam bracket assembly 286 in the upright position shown in FIG. 15. The screw channel 290 includes internal helical threads 292 that mesh with the external helical threads 274 of the screw shaft 272. Though not shown, the aft shear pin bracket 244 may be mounted on a shear pin bracket mount having a similar configuration for receiving and engaging the screw shaft 272.

Due to the meshing of the helical threads 274, 292, the fuselage 12 will move forward when the shaft drive device 284 rotates the screw shaft 272 in a first direction, and will move aft when the shaft drive device 284 rotates the screw shaft 272 in the opposite direction. Because the fuselage positioning mechanism 270 does not require manual intervention to move the fuselage 12 as is necessary for the fuselage positioning mechanisms 50, 100, the shaft drive device 284 may be actuated during flight to reposition the fuselage 12 if necessary. Such in-flight repositioning may be necessary if the payload 46 shifts after takeoff and moves the center of gravity 40 of the aircraft 10, as fuel is burned off by the engine and the center of gravity 40 of the aircraft 10 moves away from the fuel tank, or a portion or all of the payload is delivered from the fuselage 12. The in-flight position adjustment can be affected to move the center of gravity 40 into the allowable range 44 relative to the center of lift 42.

INDUSTRIAL APPLICABILITY

Figure 16:
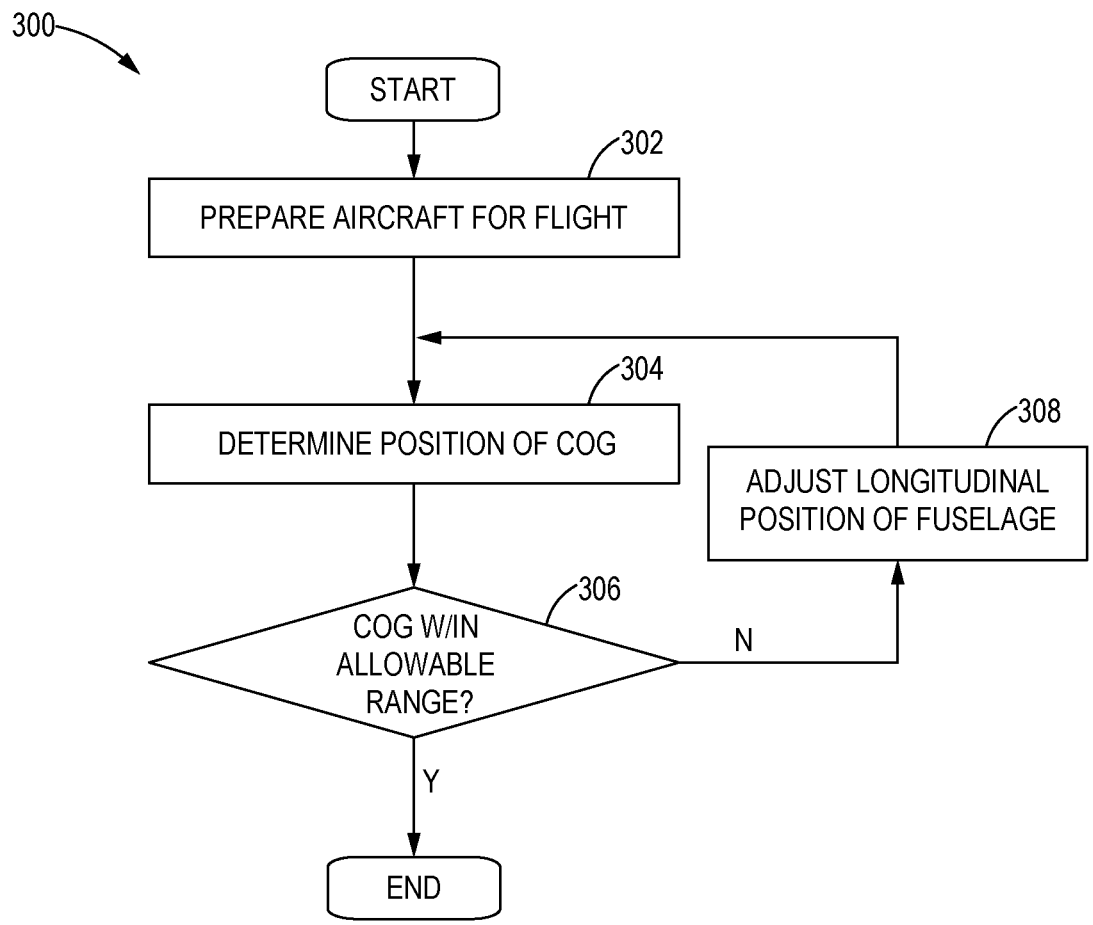
FIG. 16 is a flow diagram of an aircraft balancing routine in accordance with the present disclosure for positioning the wing assembly of the aircraft of FIG. 1.

The fuselage positioning mechanisms 50, 100, 270 illustrated and described herein facilitate adjustment of the longitudinal position of the fuselage 12 to balance the center of gravity 40 and the center of lift 42 of the aircraft 10 to compensate for changes in the location and magnitude of the center of gravity 40 caused by changes in the mass and locations of payloads 46 carried by the aircraft 10, fuel stored in the aircraft 10 and other load factors. FIG. 16 illustrates an exemplary aircraft balancing routine 300 that may be used to determine when to adjust the longitudinal position of the fuselage 12 to bring the center of gravity 40 within the allowable range 44 of the center of lift 42. In the aircraft 10 as discussed herein, the fuselage 12 contributes minimally to the lift of the aircraft 10, so the center of lift 42 is concentrated at a fixed location on the wing assembly 24. The allowable range 44 of positions for the center of gravity 40 is also known and may be machined, inscribed or otherwise indicated on the wing assembly 24.

The balancing routine 300 may begin at a block 302 where the aircraft 10 is prepared for flight. The flight preparation may include loading the payload 46 into or removing the payload 46 from the fuselage 12, depending on the requirements of the upcoming flight. As discussed above, the weight and position of the payload 46 affect the position of the center of gravity 40 of the aircraft 10. In some applications, the fuselage 12 and the wing assembly 24 may have modular designs so that different fuselages 12 having different configurations and capabilities may be used with a given wing assembly 24. For example, different fuselages 12 may have different sensors and other equipment for surveying the area over which the aircraft 10 will fly and collecting video and other data pertinent to the surveyed area. In other implementations, the fuselages 12 may have different capacities for transporting and deploying the payload 46 during the flight, such as where the aircraft 10 may transport parcels and drop off the parcels at delivery locations along the flight route. During the preparation of the aircraft 10, the fuselage 12 will be positioned relative to the wing assembly 24 using the implemented positioning mechanism, such as one of the fuselage positioning mechanisms 50, 100, 270 described above. Where the fuselage positioning mechanism 100 is implemented, for example, the cam bracket assembly 108 and the aft shear pin bracket assembly 240 are positioned along the positioning rail 102, and the cam bracket assembly 108 is clamped to the center wing sway rib assembly 130 with the aft shear pin 256 inserted in the shear pin bore 260.

Once the aircraft 10 is prepared for flight at the block 302, control of the routine 300 passes to a block 304 where the longitudinal position of the center of gravity 40 of the prepared aircraft 10 is determined. The location of the center of gravity 40 may be determined by any appropriate means. For example, the aircraft 10 may include sensors (not shown) for sensing the weight distribution within the aircraft 10, and the sensor signals with the measured loads may be used automatically by a controller or manually by a technician to calculate the position of the center of gravity 40. The same processing can be used when the payload 46 is loaded and when the fuselage 12 is empty. Similar calculations may be performed if the aircraft 10 is supported by two or more scales (not shown) providing weight measurements that can be used to calculate the location of the center of gravity 40. In other implementations, the technicians setting up the aircraft 10 for flight may know the approximate location of the center of gravity 40 when the aircraft 10 is empty from previous calculations or experience. If the payload 46 is added, the technician may use the mass and location of the payload 46 to determine an adjusted position of the center of gravity 40 accounting for the payload 46.

In a further alternative approach, balance points are machined on the wing assembly 24 that represent the forward and aft limits of the allowable range 44 as discussed above. The approximate location of the center of gravity 40 can be determined by balancing the aircraft 10 at the balance points at each end of the allowable range 44. When the center of gravity 40 is within the allowable range 44, the aircraft 10 will tip forward when supported at the aft balance point, and will tip aft when supported at the forward balance point. The center of gravity 40 is forward of the allowable range 44 if the aircraft 10 tips forward at both balance points, and is aft of the allowable range 44 if the aircraft 10 tips aft at both balance points. Further alternative strategies for determining the location of the center of gravity 40 will be apparent to those skilled in the art.

After the longitudinal position of the center of gravity 40 is determined at the block 304, and with the positions of the center of lift 42 and the allowable range 44 known as discussed above, a need for adjusting the position of the fuselage 12 to balance the aircraft 10 can be determined. Control may pass to a block 306 to determine if the center of gravity 40 is within the allowable range 44. If the center of gravity 40 is within the allowable range 44 then the fuselage 12 does not have to be moved to balance the aircraft 10. In this case, control may pass to the end of the balancing routine 300 and the balancing routine 300 may terminate.

If the center of gravity 40 is not within the allowable range 44, then the fuselage 12 must be moved to balance the aircraft 10. Control may pass to a block 308 for adjustment of the longitudinal position of the fuselage 12 to move the center of gravity 40 between the fuselage maximum positions and within the allowable range 44. Where the fuselage positioning mechanism 50 is implemented, the forward wing connection assembly 52 and the aft wing connection assembly 54 are repositioned and aligned with a different set of apertures 70, 72, respectively. For the fuselage positioning mechanism 100, the mounts 110, 246 are unlocked so the forward wing connection assembly 104 and the aft shear pin bracket assembly 240 can be moved along the positioning rail 102 and the mounts 110, 246 relocked where the center of gravity 40 is estimated to be within the allowable range 44. In implementations with the fuselage positioning mechanism 270, the shaft drive device 284 is actuated to rotate the screw shaft 272 and move the fuselage 12 to the new position. After the fuselage 12 is moved to and locked in the new position, control of the balancing routine 300 may return to the block 304 to determine the new position of the center of gravity 40 of the aircraft 10 and to the block 306 to determine whether new position of the center of gravity 40 is within the allowable range 44. The iterative process and adjustments to the position of the fuselage 12 and, correspondingly, the center of gravity 40 may continue until the center of gravity 40 is within the allowable range 44 at the block 308, at which time the balancing routine 300 will terminate until the next change to the center of gravity 40 of the aircraft 10.

With automated positioning mechanisms such as the fuselage positioning mechanism 270, the balancing routine 300 may execute continuously or at periodic intervals during flight to continuously monitor the position of the center of gravity 40 and adjust the position of the fuselage 12 as necessary to maintain balance in the aircraft 10 throughout the flight. The automated positioning mechanisms also provide the ability to schedule adjustments of the position of the fuselage 12 at predictable times during fights where the center of gravity 40 has or will shift and the amount of position adjustment is determinable. For example, fuel usage by the aircraft 10 may be measured or estimated during flight, and the impact to the center of gravity 40 of the aircraft 10 calculated based on this data. Based on the location of the fuel tanks, the center of gravity 40 may move forward or aft over time as the fuel is used. The point at which the center of gravity 40 will approach an end of the allowable range 44 may be calculated in advance, and an onboard controller may actuate the shaft drive device 284 of the fuselage positioning mechanism 270 to move the center of gravity 40 back toward the center of lift 42. In other applications, the timing of an event that will change the payload 46 carried by the aircraft 10 may be known and a corresponding adjustment of the position of the fuselage 12 can be scheduled to occur at the same time. For example, the aircraft 10 may be transporting a secondary UAV that may be deployed during the flight resulting in an instantaneous change in the payload 46 carried by the aircraft 10. In package delivery applications, parcels may be deployed from the aircraft 10 at scheduled locations along the flight path, and adjustments to the position of the fuselage 12 can be preplanned to correspond to the package deployments and maintain the center of gravity 40 within the allowable range 44. Similar in-flight position adjustment scheduling may be performed for other predictable situations where the position of the center of gravity 40 may change relative to the center of lift 42.

Situations can arise where the payload 46 moves the center of gravity 40 to a position where the fuselage 12 would be required to move beyond one of the fuselage maximum positions to bring the center of gravity 40 within the allowable range 44 and balance the aircraft 10. To handle these situations, the balancing routine 300 may be modified to move the fuselage 12 to the maximum forward or aft position of the fuselage positioning mechanisms 50, 100, 270, whichever brings the center of gravity 40 closest to the allowable range 44. After the fuselage 12 is moved, ballast may be loaded into the fuselage 12 to finish balancing the aircraft 10 in a similar manner as previously-known aircraft. The ballast may have a mass and be positioned to move the center of gravity 40 within the allowable range 44. The weight of the aircraft 10 may be increased by the ballast, but in most situations the ability to move the fuselage 12 and the center of gravity 40 may reduce the ballast needed to balance the aircraft 10 to less than would be required for previously-known aircraft having fuselages that are fixed relative to the wings.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An aircraft comprising:
    a fuselage having a longitudinal axis;
    a wing assembly having a transverse axis that is perpendicular to the longitudinal axis, a center wing, a right wing extending outward from the center wing in a transverse direction and a left wing extending outward from the center wing opposite the right wing in the transverse direction; and
    a fuselage positioning mechanism operatively connecting the fuselage to the wing assembly, wherein the fuselage positioning mechanism is operable to move the fuselage relative to the wing assembly in a longitudinal direction parallel to the longitudinal axis between a fuselage maximum forward position and a fuselage maximum aft position, and wherein the fuselage positioning mechanism comprises:
        a fuselage positioning rail mounted on the fuselage and parallel to the longitudinal axis, and
        a forward wing connection assembly comprising a cam bracket assembly mounted on the fuselage positioning rail and movable between a plurality of discrete positions in the longitudinal direction, wherein the cam bracket assembly is operatively connected to the wing assembly so that movement of the cam bracket assembly along the fuselage positioning rail facilitates movement of the fuselage in the longitudinal direction between the fuselage maximum forward position and the fuselage maximum aft position, and wherein the cam bracket assembly comprises a cam bracket assembly locking mechanism that alternately engages the fuselage positioning rail to maintain the cam bracket assembly in a longitudinal position along the fuselage positioning rail and disengages from the fuselage positioning rail to allow the cam bracket assembly to move between the plurality of discrete positions along the fuselage positioning rail in the longitudinal direction.

2. An aircraft comprising:
    a fuselage having a longitudinal axis;
    a wing assembly having a transverse axis that is perpendicular to the longitudinal axis, a center wing, a right wing extending outward from the center wing in a transverse direction and a left wing extending outward from the center wing opposite the right wing in the transverse direction; and
    a fuselage positioning mechanism operatively connecting the fuselage to the wing assembly, wherein the fuselage positioning mechanism is operable to move the fuselage relative to the wing assembly in a longitudinal direction parallel to the longitudinal axis between a fuselage maximum forward position and a fuselage maximum aft position, and wherein the fuselage positioning mechanism comprises:
        a fuselage positioning rail mounted on the fuselage and parallel to the longitudinal axis, and
        a forward wing connection assembly comprising a cam bracket assembly mounted on the fuselage positioning rail and movable between a plurality of discrete positions in the longitudinal direction, wherein the cam bracket assembly is operatively connected to the wing assembly so that movement of the cam bracket assembly along the fuselage positioning rail facilitates movement of the fuselage in the longitudinal direction between the fuselage maximum forward position and the fuselage maximum aft position, wherein the forward wing connection assembly comprises a center wing sway rib assembly operatively connected to the wing assembly, and wherein the cam bracket assembly comprises a cam lock arm that is movable between a locked position where the cam lock arm engages the center wing sway rib assembly to lock the cam bracket assembly to the center wing sway rib assembly for movement together in the longitudinal direction and an unlocked position where the cam lock arm is disengaged from the center wing sway rib assembly to allow the cam bracket assembly and the center wing sway rib assembly to move independently in the longitudinal direction.

3. The aircraft of claim 2, wherein the cam bracket assembly comprises a cam lock head washer mounted on a threaded portion of the cam lock arm, and wherein the center wing sway rib assembly comprises a cam lock receiving slot receiving the cam lock arm and the cam lock head washer when the cam lock arm moves to the locked position and a head washer engagement surface that engages the cam lock head washer to prevent the cam lock head washer from pulling through the cam lock receiving slot.

4. The aircraft of claim 2, wherein the fuselage positioning mechanism comprises an aft wing connection assembly comprising:
    an aft shear pin bracket assembly having an aft shear pin extending rearward therefrom, wherein the aft shear pin bracket assembly is mounted on the fuselage positioning rail and movable thereon in the longitudinal direction; and
    a wing shear pin block operatively connected to the wing assembly aft of the center wing sway rib assembly so that the wing shear pin block moves with the wing assembly in the longitudinal direction, and wherein the wing shear pin block comprises a shear pin bore that receives and engages the aft shear pin so that the aft shear pin carries shear loads created when forces on the fuselage and the wing assembly cause the aft shear pin bracket assembly and the wing shear pin block to move in opposite directions perpendicular to the longitudinal axis.

5. A method for balancing an aircraft having a fuselage and a wing assembly mounted thereon for movement of the fuselage relative to the wing assembly in a longitudinal direction that is parallel to a longitudinal axis of the fuselage between a fuselage maximum forward position and a fuselage maximum aft position, wherein the wing assembly has a transverse axis that is perpendicular to the longitudinal axis, a center wing, a right wing extending outward from the center wing in a transverse direction and a left wing extending outward from the center wing opposite the right wing in the transverse direction, wherein the aircraft further includes a fuselage positioning rail mounted on the fuselage and parallel to the longitudinal axis, and a forward wing connection assembly comprising a cam bracket assembly mounted on the fuselage positioning rail and movable between a plurality of discrete positions in the longitudinal direction and having a cam bracket assembly locking mechanism that alternately engages the fuselage positioning rail to maintain the cam bracket assembly in the longitudinal position and disengages from the fuselage positioning rail to allow the cam bracket assembly to move between the plurality of discrete positions along the fuselage positioning rail in the longitudinal direction, wherein the cam bracket assembly is operatively connected to the wing assembly so that movement of the cam bracket assembly along the fuselage positioning rail facilitates movement of the fuselage in the longitudinal direction between the fuselage maximum forward position and the fuselage maximum aft position, and wherein the cam bracket assembly is demountably attached to the wing assembly, the method comprising:
preparing the aircraft for flight;
determining a position of a center of gravity of the aircraft along the longitudinal axis;
determining whether the center of gravity is within an allowable range of longitudinal distances from a center of lift of the aircraft;
detaching the cam bracket assembly from the wing assembly response to determining that the center of gravity is not within the allowable range of longitudinal distances from the center of lift;
unlocking the cam bracket assembly locking mechanism from the fuselage positioning rail;
moving the cam bracket assembly along the fuselage positioning rail after the cam bracket assembly is detached from the wing assembly and to a balance position to bring the center of gravity within the allowable range of longitudinal distances from the center of lift;
locking the cam bracket assembly locking mechanism to the fuselage positioning rail;
sliding the wing assembly along the fuselage to the balance position of the cam bracket assembly; and
attaching the cam bracket assembly to the wing assembly to hold the fuselage in position relative to the wing assembly.

6. A fuselage positioning mechanism for moving a fuselage of an aircraft relative to a wing assembly of the aircraft in a longitudinal direction that is parallel to a longitudinal axis of the fuselage, wherein the wing assembly has a transverse axis that is perpendicular to the longitudinal axis, a center wing, a right wing extending outward from the center wing in a transverse direction and a left wing extending outward from the center wing opposite the right wing in the transverse direction, the fuselage positioning mechanism comprising:
a fuselage positioning rail mounted on the fuselage and parallel to the longitudinal axis; and
a cam bracket assembly mounted on the fuselage positioning rail and movable thereon between a plurality of discrete positions in the longitudinal direction, wherein the cam bracket assembly is operatively connected to the wing assembly so that movement of the cam bracket assembly along the fuselage positioning rail facilitates movement of the fuselage in the longitudinal direction between a fuselage maximum forward position and a fuselage maximum aft position, wherein the cam bracket assembly comprises a cam bracket assembly locking mechanism that alternately engages the fuselage positioning rail to maintain the cam bracket assembly in a longitudinal position along the fuselage positioning rail and disengages from the fuselage positioning rail to allow the cam bracket assembly to move between the plurality of discrete positions along the fuselage positioning rail in the longitudinal direction.

7. A fuselage positioning mechanism for moving a fuselage of an aircraft relative to a wing assembly of the aircraft in a longitudinal direction that is parallel to a longitudinal axis of the fuselage, wherein the wing assembly has a transverse axis that is perpendicular to the longitudinal axis, a center wing, a right wing extending outward from the center wing in a transverse direction and a left wing extending outward from the center wing opposite the right wing in the transverse direction, the fuselage positioning mechanism comprising:
a fuselage positioning rail mounted on the fuselage and parallel to the longitudinal axis;
a center wing sway rib assembly operatively connected to the wing assembly; and
a cam bracket assembly mounted on the fuselage positioning rail and movable thereon between a plurality of discrete positions in the longitudinal direction, wherein the cam bracket assembly is operatively connected to the wing assembly so that movement of the cam bracket assembly along the fuselage positioning rail facilitates movement of the fuselage in the longitudinal direction between a fuselage maximum forward position and a fuselage maximum aft position, wherein the cam bracket assembly comprises a cam lock arm that is movable between a locked position where the cam lock arm engages the center wing sway rib assembly to lock the cam bracket assembly to the center wing sway rib assembly for movement together in the longitudinal direction and an unlocked position where the cam lock arm is disengaged from the center wing sway rib assembly to allow the cam bracket assembly and the center wing sway rib assembly to move independently in the longitudinal direction.

8. The fuselage positioning mechanism of claim 7, wherein the cam bracket assembly comprises a cam lock head washer mounted on a threaded portion of the cam lock arm, and wherein the center wing sway rib assembly comprises a cam lock receiving slot receiving the cam lock arm and the cam lock head washer when the cam lock arm moves to the locked position and a head washer engagement surface that engages the cam lock head washer to prevent the cam lock head washer from pulling through the cam lock receiving slot.

9. A fuselage positioning mechanism for moving a fuselage of an aircraft relative to a wing assembly of the aircraft in a longitudinal direction that is parallel to a longitudinal axis of the fuselage, wherein the wing assembly has a transverse axis that is perpendicular to the longitudinal axis, a center wing, a right wing extending outward from the center wing in a transverse direction and a left wing extending outward from the center wing opposite the right wing in the transverse direction, the fuselage positioning mechanism comprising:
a fuselage positioning rail mounted on the fuselage and parallel to the longitudinal axis;
a cam bracket assembly mounted on the fuselage positioning rail and movable thereon between a plurality of discrete positions in the longitudinal direction, wherein the cam bracket assembly is operatively connected to the wing assembly so that movement of the cam bracket assembly along the fuselage positioning rail facilitates movement of the fuselage in the longitudinal direction between a fuselage maximum forward position and a fuselage maximum aft position;

an aft wing connection assembly comprising:

an aft shear pin bracket assembly having an aft shear pin extending rearward therefrom, wherein the aft shear pin bracket assembly is mounted on the fuselage positioning rail and movable thereon in the longitudinal direction; and a wing shear pin block operatively connected to the wing assembly aft of the forward wing connection assembly so that the wing shear pin block moves with the wing assembly in the longitudinal direction, and wherein the wing shear pin block comprises a shear pin bore that receives and engages the aft shear pin so that the aft shear pin carries shear loads created when forces on the fuselage and the wing assembly cause the aft shear pin bracket assembly and the wing shear pin block to move in opposite directions perpendicular to the longitudinal axis.

* * * * *